United States Patent [19]

Evans

[11] 4,340,711
[45] Jul. 20, 1982

[54] PROCESS FOR THE PREPARATION OF GRANULAR SILARYLENESILOXANE COPOLYMERS POLYMERIZED UNDER CONDITIONS OF SHEAR

[75] Inventor: Edwin R. Evans, Elnora, N.Y.

[73] Assignee: General Electric Company, Waterford, N.Y.

[21] Appl. No.: 225,576

[22] Filed: Jan. 16, 1981

[51] Int. Cl.³ .................................................. C08G 77/06
[52] U.S. Cl. ........................................ 528/21; 525/477; 528/23; 528/33; 528/35; 528/43
[58] Field of Search .................... 528/35, 33, 43, 21, 528/23; 260/18 S; 525/477

[56] References Cited

U.S. PATENT DOCUMENTS 3,803,084  4/1974  Schnurrbusch et al. ....... 260/37 SB
3,959,403  5/1976  LaRochelle ..................... 260/825
3,965,134  6/1976  LaRochelle ..................... 260/825

*Primary Examiner*—Melvyn I. Marquis

[57] ABSTRACT

A process for the preparation of curable high molecular weight silarylenesiloxane-polydiorganosiloxane copolymers (tough rubber) in a low density granular form by creating the conditions of mechanical shear during the recrystallization, or cooling stage, following the polymerization. A high shear mixer, for example dough mixer, can serve as the polymerization vessel. The granular product obtained is easily handled and can be compounded quickly and efficiently with fillers or process aids as needed for the production of extruded or molded products.

5 Claims, No Drawings

PROCESS FOR THE PREPARATION OF GRANULAR SILARYLENESILOXANE COPOLYMERS POLYMERIZED UNDER CONDITIONS OF SHEAR

The present invention relates to a process for the preparation of high molecular weight silarylenesiloxane copolymers useful as high strength silicone rubber and more particularly to a new and improved direct process for the preparation of high molecular weight silarylenesiloxane copolymers (tough rubber) in low density granular form under conditions of mechanical shear during the polymerization and crystallization stages.

BACKGROUND OF THE INVENTION

The condensation polymerization of silphenylene diol with disiloxanol fluids in the presence of a condensation catalyst and a solvent, is described in U.S. Pat. No. 3,202,634 incorporated herein by reference and is shown generally in the equation below:

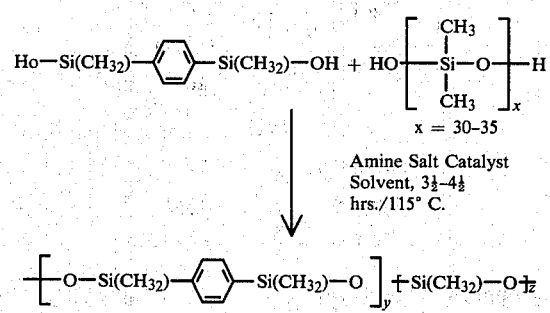

where x is equal to 30–35, y is equal to 9–12, and z is equal to 30–40.

The polymerization yields a high molecular weight semi-crystalline block copolymer, the melting point (Tm) of which is dependent upon the mole fraction of ($Me_2SiO$) and the degree of randomness. Water formed during polymerization is removed azeotropically to permit a build-up in viscosity as polymer chains lengthen. The preferred polymerization catalysts are amine salts, and the resultant polymers are soluble in halogenated solvents.

In the foregoing polymerization, a combination of high molecular weight and high crystalline melt temperatures of the copolymer of greater than 90° C. causes isolation problems when the reaction is carried out in standard polymerization vessels. The copolymer must either be dissolved while in the polymerization vessel in a suitable solvent and discharged as a liquid solution, for example, a 35 percent solution of the silarylenesiloxane copolymer in methylene chloride, or the copolymer can be discharged from the polymerization vessel while hot and in the molten state, for example, through a ribbon extruder.

In order to facilitate handling and compounding of the curable polymeric compositions, these compositions should preferably be in a low density, dry, granular, free-flowing form which facilitates handling, bulk loading, shipping and mixing or compounding. Granular compositions of uniform density are desirable for accurate metering and transfer to extrusion or injection molding machinery.

In the prior art, these block copolymers after polymerization in the polymerization vessel were either redissolved in a suitable solvent, for example, methylene chloride, discharged as a solvent solution then reprecipitated in alcohol to give a granular product, or, alternatively, the polymer from the polymerization vessel is melted or maintained in a molten state and discharged hot, for example, through a ribbon extruder at high temperature, then cooled, for example, in a trough of water to form sheets or strips of the curable polymer. These sheets or strips were then cut or diced to a particle size which facilitates operations such as shipping and handling and made possible efficient compounding or blending of the copolymer with fillers, extenders or coagents in extrusion or injection molding machinery. Both of these methods have serious shortcomings. The redissolution and precipitation method requires, for each pound of curable polymer, approximately three pounds of solvent to dissolve the polymer, and an additional 10 pounds of alcohol to precipitate the dissolved polymer. This process involves relatively high isolation costs including solvent recovery and the cost of unrecoverable solvent.

The method involving cutting or dicing the sheets or strips of the curable polymer is rate limited by the possibility of melting the polymer on the cutting blades due to the heat generated by shear in the cutting operation.

The above-mentioned methods are costly in terms of both time, labor, solvent recovery and solvent loss.

SUMMARY OF THE INVENTION

One object of the present invention is to provide a new and improved process for the preparation of curable high molecular weight silarylenesiloxane copolymers.

Another object of the present invention is to provide a process for the production of high molecular weight silarylenesiloxane copolymers which results in a granular thermoplastic material with low bulk density of between about 0.25 and about 0.40 g/ml.

Another object of the present invention is to provide a process for the preparation of curable silarylenesiloxane copolymers which is more cost efficient with respect to time, labor and materials and which results in a granular, easily handled, easily compounded composition.

Another object of the present invention is to provide a polymerization procedure for plant use which permits the use of existing equipment, eliminates reactor discharge problems, and eliminates the need for solvents and polymer precipitation.

These and other objects are accomplished by a process for the polymerization and crystallization of high molecular weight silarylenesiloxane copolymers under conditions of mechanical shear to produce a dry granular thermoplastic material with low bulk density. The polymerization and crystallization under conditions of shear produces controlled agglomeration so that particle size can be controlled and a dry granular product of low bulk density which is easily handled and which can be quickly and efficiently compounded with fillers or coagents, can be produced.

Further objects of the invention, together with additional features and advantages thereof will become readily apparent to those skilled in the art in view of the following detailed description.

DESCRIPTION OF THE PREFERRED EMBODIMENTS

In the practice of the invention, the high molecular weight silarylenesiloxane copolymers are prepared under conditions of mechanical shear in a shear generating device, for example, a dough mixer serving as the polymerization vessel. Shear generating mixer and high shear mixer are used interchangeably and a dough mixer is an example of a shear generating mixer wherein the mixing blades rotate to generate shear. The reaction is carried out under conditions of shear in a dough mixer by heating a silphenylenediol, a silanol-terminated polydiorganosiloxane, an inert organic solvent to dissolve the monomers and to adjust the viscosity of the mixer and any other necessary reactants, to a temperature at which curing or thermal decomposition of the reactants or products occurs. At this point the dough mixer is turned on, and an amine acid condensation catalyst is added. The polymerization is timed from this point, and an inert gas sweep is maintained to facilitate the removal of both the occluded and formed water as an azetrope with toluene. After a sufficient amount of time to effect polymerization, the condensation catalyst may be deactivated and removed by distillation in the form of an azeotrope in a suitable solvent. After substantially all water and solvent have been removed, heating of the copolymer is discontinued while the shear rate is increased, thereby allowing the copolymer to cool. Cooling of the composition is actively continued, for example, by utilizing a cooling jacket on the mixer or by the addition of a coolant such as solid carbon dioxide. The composition is cooled until it reaches its crystallization temperature, and crystallization begins to take place. The shear-generating mixing action by the high shear mixer is continued until the polymer is completely in the granular form and can be discharged from the vessel. With the onset of crystallization the shear-generating mixing action must be continued to assure the formation of discrete granules as the temperature of the polymer falls below its melt temperature. If the mixing action is stopped during the onset of crystallization, massing or agglomeration would take place. When massing occurs, the cohesive energy density of the solidified mass is sufficient to preclude any further agitation. In this situation, the vessel must be reheated to above the melt temperature of the composition and held at that temperature until the polymer is completely melted at which point rotation of the dough mixer blades can be resumed.

The silarylenesiloxane-polydiorganosiloxane block copolymers are prepared by effecting a condensation between the silphenylenediol and the silanol-terminated polydiorganosiloxane in the presence of an amine acid catalyst and an inert organic solvent. The silphenylenediol is shown in Formula (1):

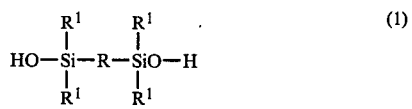

wherein R is a divalent aromatic organic radical, and $R^1$ is a monovalent organic radical.

In preferred embodiments of the present invention, divalent organic radicals designated by R in the silphenylenediol of Formula (1) include, for example, divalent aromatic hydrocarbon radicals such as phenylene, tolylene, xylylene, naphthalene, 4,4'-biphenylene, 4,4'-diphenylene ether, and the like; halogenated divalent aromatic hydrocarbon radicals such as chlorophenylene, bromonaphthalene; and the like. In preferred embodiments of the present invention, the monovalent organic radicals designated by $R^1$ in the silphenylenediol of Formula (1) include, for example, alkyl radicals such as methyl, ethyl and propyl; aryl radicals such as phenyl and naphthyl; alkaryl radicals such as tolyl and xylyl; unsaturated aliphatic radicals such as vinyl, allyl, and propenyl; and halogenated radicals such as chlorophenyl and 3,3,3-trifluoropropyl. In Formula (1), radicals can be the same or different. Thus, for example, the $R^1$ radicals can be a combination of ethyl and methyl radicals. Examples of the dialkoxysilarylene for Formula (1) are:

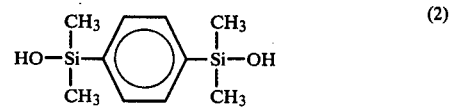

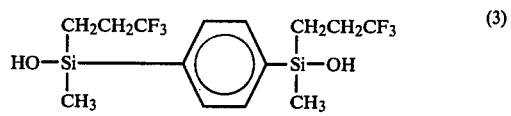

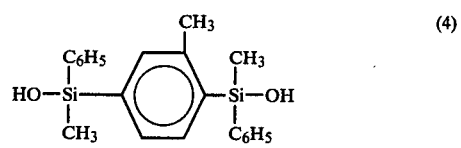

and the like.

The silanol-terminated diorganopolysiloxane or siloxanol fluid which can be employed, is shown in Formula (5):

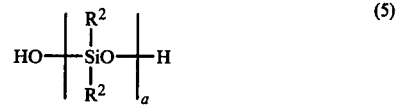

where a is an integer equal to from about 5 to about 10,000 inclusive, preferably an average of from about 10 to about 1,000 inclusive, and $R^2$ is an organic radical having from about 1 to about 13 carbon atoms. Depending upon the block size and weight percent of the polydiorganosiloxane desired in the final block copolymer, the block length of the siloxanol fluid can vary widely as shown by Formula (5). In preferred embodiments of the present invention, the organic radicals designated by $R^2$ in Formula (5) for the silanol-terminated polydiorganosiloxane are organic radicals containing from 1 to about 13 carbon atoms and are selected from the group consisting of straight chain and/or branched chain monovalent hydrocarbon radicals, for example, alkyl radicals such as methyl, ethyl, propyl, butyl, isobutyl, isopropyl, heptyl, stearyl, and the like, aryl radicals, such as phenyl, naphthyl, and the like; alkaryl radicals such as tolyl and xylyl; unsaturated aliphatic radicals such as vinyl, allyl, propenyl, or halogenated radicals such as chlorophenyl and 3,3,3-trifluoropropyl, Examples of the silanol-terminated polydiorganosiloxane of Formula (5) which can be employed in the practice of the present invention are:

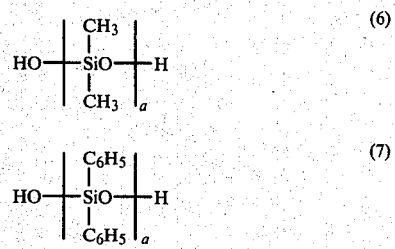

wherein a is an integer from about 1 to about 10,000 inclusive, preferably an average of from about 10 to about 1,000, inclusive.

The silanol-terminated polydiorganosiloxanes, such as silanol-terminated polydimethylsiloxane, can be made by reacting hydrolyzable diorganosiloxane with an amount of water sufficient to accomplish the hydrolysis in the presence of a suitable acid or base catalyst to tailor the viscosity of the polymer to the desired range. The range of the viscosity of this polymer is between about 50 and about 70 centipoise, and the preferred range of the viscosity is between about 55 and about 60 centipoise. The polydiorganosiloxane, which can be employed to make the silanol-terminated polydiorganosiloxanes, can also be made by conventional equilibration procedures by heating a cyclic polydiorganosiloxane, for example, a cyclic polysiloxane containing from about 3 to about 8 chemically combined diorganosiloxy units, such as dimethylsiloxy units, methylphenylsiloxy units, methylvinylsiloxy units, and the like, in the presence of a basic catalyst, such as potassium hydroxide, sodium hydroxide, and the like. In order to convert the polydiorganosiloxane to silanol-terminated polydiorganosiloxane having a particular viscosity, water can be added to the polydiorganosiloxane, and the mixture can be heated to between about 150° C. and about 200° C. for about 8 hours or less.

The amine acid salt condensation catalysts which can be used in the present invention are not critical; however, in accordance with the process of this invention, only one such catalyst is required. In preferred embodiments of the process of this invention, an amine acid salt catalyst is used at a concentration of between about 0.1 percent and about 1.5 percent preferably between about 0.3 percent and about 0.8 percent by weight of the reactants. Examples of amine acid condensation catalysts are disclosed by Merker in U.S. Pat. No. 3,160,601 and by Falk in U.S. Pat. No. 3,032,530 and include, for example, amine salts of phosphoric acid and amine salts of carboxylic acids. Condensation catalysts are amine-type salts which can be prepared by reacting ammonia and organic amine, or an amine organosilicone compound with a phosphoric or carboxylic acid. The amine salts include, for example, di-2-ethylhexylamine acetate, triphenylsilpropylamine formate, trimethylsiloxydimethylsilhexylamine hexoate, 4,4-diaminobenzophenone butyrate, 4,4'-diaminobenzophenone butyrate, 4,4'-diamino diphenyl ether decanoate, tri-n-butylamine acrylate, 3,4'-dichloro-aniline caproate, aniline octanoate, didodecylamine, o-chlorophenoxyacetate, ethylamine, 3-ethoxypropionate, diethylene trimaine monooleate, diisopropylamine palmitate, trimethylamine stearate, benzylhydroazine hexoate, 2,5-dimethylpiperazine octoate, di(octadecylamine) sebacate, ethylenediamine di-hexoate, tetraethylene pentamine diphosphate, 1,2-aminopropane phenylphosphate and ammonium stearate.

The inert organic solvent or solvents used to dissolve and dilute the reactants to keep their viscosity within a workable range for the mixer are not critical in the process of the present invention. These solvents are used at concentrations of between 5 percent and about 90 percent by weight based upon the weight of the reactants and are used to assist in the removal of the alcohol byproduct together with any water as an alcohol-water azetrope. Solvents which can be used in the practice of the invention are, for example, the inert organic solvents including non-polar organic solvents such as benzene, toluene, xylene, ethylbenzene, and the like, the polar aprotic organic solvents, such as chloroform, chlorobenzene, chlorotoluene, methylene chloride and the like. The dilution by these solvents, however, may tend to slow the rate of condensation. The hydrocarbon solvent-alcohol-water mixture can be removed by, for example, vacuum distillation or dry nitrogen sparging leaving the silarylenesiloxane-polydiorganosiloxane block copolymer. The total polymerization time can vary from about 2 hours to about 36 hours, preferably from about 3 hours to about 6 hours depending on the polymerization temperatures utilized over the range of about 90° C. to about 170° C. and more preferably from about 105° C. to about 125° C.

The final stripping or devolatilization of the block copolymer to remove any volatiles can be achieved after about 0.5 to about 8.0 hours, at temperatures in the range of from about 90° C. to about 170° C. The residue thereafter can be treated with an inert organic solvent such as, for example, toluene, to form an azetrope and distill out the last traces of water.

Recovery of the silarylenesiloxane block copolymer is achieved by allowing the condensation reaction mixture to cool while continuing the shear generating mixing. Cooling is continued until the composition is below its crystallization temperature and the product attains a granular form.

The polymers are essentially linear since they dissolve in toluene indicating little, if any, cross-linking. The polymerization time-temperature-catalyst level and monomer ratios are all factors in determining the structure of the copolymer as well as being responsible for the existence, if any, of possible siloxane bond rearrangement, and various conventional parameters can be adjusted and controlled by one skilled in the art to obtain the desired or optimum structure without undue experimentation.

The physical properties of compound vulcanizates are a reflection of the molecular weight of the polymer, and the degree of polymerization of the hard and soft segments. An empirical method of determining the proper molecular weight and degree of polymerization is to measure the total polymerization time for a given temperature and shear rate and then relate this to the physical properties of the composition obtained. Since timing of the polymerization is only a marginal in-process measurement tool, it is preferred that constant temperature and shear be maintained. Too short a polymerization time will result in a lower molecular weight and too long a time may permit scrambling or change in block lengths resulting in a concomitant loss in some mechanical strength.

The checking of the green strength of the polymer when it is suspected of being at the proper degree of polymerization, is a judgment which comes from knowledge and experience with these polymers and can be determined by one skilled in the art. An inherent viscosity measurement would be suitable but this is not a quick procedure and does not lend itself to in-process testing.

The high shear mixer can be a source of product contamination. The journal boxes should be free of solvent soluble impurities; it would be advantageous to clean and repack the journal boxes prior to carrying out the polymerization. The preferred packing is teflon impregnated asbestos which is prewashed with toluene to remove the impregnated Apiezon, a polyether type grease. If not removed, the grease can be leached out of the packing and transported into the polymer where it can serve as a potential chain modifier to preclude the development of desired molecular weight.

The block copolymers produced by the present invention having aliphatic unsaturated organic radicals, such as vinyl radicals attached to silicon by carbonsilicon linkages, can be blended with peroxide curing catalysts such as benzoyl peroxide and dicumyl peroxide, to produce thermally curable extrudable mixtures useful as insulation, especially wire insulation, and jacketing material and in addition for use in molded goods. Block copolymers which do not contain cure sites on the chain may be blended with a sufficient amount of a high vinyl containing gum of about 13 mole percent vinyl-on-chain, to provide between about 0.1 and about 0.5 mole percent vinyl-on-chain in the final blend. This blend can then be mixed with a peroxide curing catalyst to produce a curable product.

The silarylenesiloxane block copolymer produced by the process of the present invention can be blended with conventional fillers, e.g., with about 1 to about 80 parts of reinforcing silica filler, such as fumed silica, per 100 parts of block copolymer.

Other additives and adjuvants conventionally used in making block copolymers and used in related polymer reactions can be suitably used in carrying out the process of the present invention as long as it does not interfere with the condensation crystallization reaction carried out under conditions of mechanical shear in accordance with the present invention.

In order that those skilled in the art may readily understand the invention, the following example is given by way of illustration and not by way of limitation. In all the examples parts are by weight and temperatures are in degrees centigrade unless otherwise stated.

The polymerization vessel used for this work was a one quart (working volume) 316 stainless steel Readco dough mixer. The mixer was equipped with sigma-type blades, and the vessel could provide shear over the range of 28 to 84 rpm. The mixer was equipped with a Vitron-A gasket on the cover, a nitrogen inlet port, a discharge port for the volatiles and a port for the addition of carbon dioxide pellets.

EXAMPLE

To a clean one and one-half quart dough mixer was added 200 grams of silphenylenediol, 115 mls of toluene (reagent grade), and 213.3 grams of disiloxanol fluid with 1.39 percent SiOH, and a viscosity of 57 centipoise. The vessel was then heated to from about 110° C. to about 115° C. and maintained at from 114° C. to about 115° C. during the course of the polymerization period. The shear rate (rotation of the blades) was initially maintained at from about 40 to about 45 rpm while adding the polymerization catalyst ingredients. Initially 142 mls of 98 percent formic acid was added, and then 18.4 mls of t-butyl amine was added. The polymerization was timed from this point, and a nitrogen sweep was maintained to facilitate the removal of both the occluded and formed water as an azetrope with toluene. The volume of the distillate was monitored since additional quantities of toluene were added to keep the viscosity at a minimum. Within one hour, 219 mls of toluene along with 36 mls of water were recovered. During that period 175 mls of solvent was added. After from about 3.5 to about 3.6 hours of polymerization 18.0 grams of phthalic anhydride dissolved in a 400 ml of toluene was added. The amine-salt complex polymerization catalyst was deactivated with the formation of the diamide as shown in the following equation:

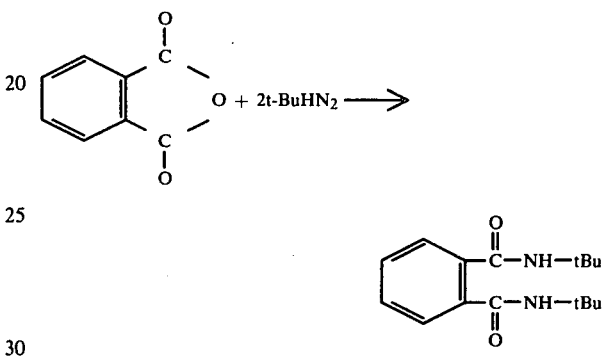

wherein Bu represents butyl. The total amount of water recovered was 53 mls; however, the amount expected to be formed via condensation was 17 to 18 mls.

After destroying the amine-salt complex, a toluene-water mixture of 1500 mls of toluene to 750 mls of water was added while maintaining the temperature at about 115° C. to remove the free acid. The solvent was then removed once the distillate was neutral to litmus. After the solvent had been purged off, heating was discontinued, and the shear rate was increased to from about 50 to about 55 rpm, and carbon dioxide pellets were added. The pellets were added incrementally until the onset of crystallization. The shear rate had to be reduced slightly as the granular product started to exert pressure on the cover of the dough mixer. The granular polymer was then discharged from the vessel to give 373 grams (approximately 94% yield) of an off-white product; the bulk density was 0.27 g/ml at 25° C. The density of the massed polymer was 1.010 g/cc at 25° C. The granular product did not display any significant tendency toward massing on standing and was very readily discharged from the vessel. The granular material also bands readily on a hot mill with surface roll temperatures of 110° C. to 130° C.

Other modifications and variations of the present invention are possible in the light of the above teachings. It is, therefore, to be understood that changes may be made and particular embodiments described which are within the full intended scope of the invention as defined in the appended claims.

What is claimed is:

1. A process for making granular high molecular weight silarylenesiloxane copolymers which comprises: heating silphenyldiol and disiloxanol to a temperature sufficiently high to melt the monomers but below the carbonization or decomposition temperature thereof in an atmosphere inert to the reactants and products; mixing the composition in a manner which generates an amount of mechanical shear sufficient to assure formation of discrete granules of silarylenesiloxane copolymer; adding an amount of a polymerization catalyst effective for copolymerizing said silphenyldiol and disiloxanol; continuing the heating and mixing for an amount of time sufficient to provide a thermoplastic composition having a bulk density between about 0.25 and 0.40 grams per milliliter; and cooling the composition to below its crystallization melt temperature while continuing the mixing, whereby a dry granular thermoplastic composition is formed.

2. The process of claim 1, wherein the catalyst is an amine acid salt.

3. The process of claim 1, further comprising a final stripping or devolatilization period at an elevated temperature.

4. The process of claim 1, wherein the shear generating mixing occurs in a dough type mixer.

5. The process of claim 1, wherein the polymerization is carried out at a temperature between about 90° C. and 120° C.

* * * * *